US005306081A

United States Patent [19]

Fukumoto

[11] Patent Number: 5,306,081

[45] Date of Patent: Apr. 26, 1994

[54] VEHICLE-MOUNTED STORAGE APPARATUS EQUIPPED WITH A SAFETY DEVICE

[75] Inventor: Masumi Fukumoto, Yokohama, Japan

[73] Assignee: NIFCO Inc., Yokohama, Japan

[21] Appl. No.: 915,987

[22] PCT Filed: Dec. 6, 1991

[86] PCT No.: PCT/JP91/01699

§ 371 Date: Sep. 23, 1992

§ 102(e) Date: Sep. 23, 1992

[87] PCT Pub. No.: WO92/10384

PCT Pub. Date: Jun. 25, 1992

[30] Foreign Application Priority Data

Dec. 6, 1990 [JP] Japan ............................ 2-400164[U]

[51] Int. Cl.[5] ........................ E05C 7/06; A47B 88/00; A47B 81/06

[52] U.S. Cl. .............................. 312/334.44; 312/222; 312/938

[58] Field of Search .................. 108/45; 312/227, 228, 312/334.44, 222; 292/DIG. 4

[56] References Cited

U.S. PATENT DOCUMENTS

| | | | |
|---|---|---|---|
| 4,779,906 | 10/1988 | Kurosaki | 292/DIG. 4 X |
| 4,917,416 | 4/1990 | Westphal et al. | 292/DIG. 4 X |
| 5,004,306 | 4/1991 | Oshida | 312/319.1 |
| 5,052,728 | 10/1991 | Fukumoto | 292/DIG. 4 X |
| 5,090,751 | 2/1992 | Kobayashi | 292/210 X |

*Primary Examiner*—Kenneth J. Dorner
*Assistant Examiner*—Nancy Mulcare
*Attorney, Agent, or Firm*—Kanesaka & Takeuchi

[57] ABSTRACT

A vehicle-mounted storage apparatus equipped with a safety device to be used as a storage device for a vehicle-mounted compact cassette case, ashtray, glove box, coin case, cup holder, cup holder, etc. When an abrupt inertia force generated e.g. by a vehicle crushing is applied, the unlocking operation of the lock device is stopped to prevent the rid etc. from being projected into the vehicle compartment. The lock device is composed of a heart-shaped cam groove (160), a lock pin (170) for tracing the cam groove (160), and a pressing spring 180 for pressing the lock pin toward the bottom of the cam groove (160). A tapered surface (165) is formed for popping up the lock pin (170) from the bottom of the cam groove (160) against the pressing force of the pressing spring (180), by engaging with the lock pin (170) when the inertia force is applied.

21 Claims, 16 Drawing Sheets

VEHICLE-MOUNTED STORAGE APPARATUS EQUIPPED WITH A SAFETY DEVICE

DESCRIPTION

1. Technical Field

This invention relates to a vehicle-mounted storage apparatus equipped with a safety device which operates when an abrupt inertia force particularly due to vehicle crushing is applied, such that any object can be prevented from projecting into the compartment of the vehicle.

2. Background Art

Conventionally, it has been known such type of storage apparatus which comprises a housing having an opening, a projecting object being held in the housing movably in the projecting direction from the opening, a forcing means for forcing the projecting object in the projecting direction from the opening of the housing, a lock device for locking the projecting object in the non-projecting position against the force of the forcing means and for unlocking the projecting object at the non-projecting position when the projecting object is further pressed toward the housing, and a safety device for stopping the unlocking operation of the lock device when an inertia force is applied (see e.g. Japanese Patent Laid-Open No. Sho 64-41434).

The above-mentioned conventional lock device is composed of a cam groove having a heart-shaped island as the center and formed in either one of the housing or the projecting object, a lock pin axially supported in residual one of the housing or projecting object, and a pressing means for pressing the lock pin toward the bottom of the cam groove.

The above-mentioned conventional cam groove is composed of an introductory path extending toward a tapering portion of the heart-shaped island, an outward path extending along one side of the heart-shaped island with a depth gradually shallowing from the introductory path, a doubled portion extending from the outward path to deeper than the shallowest end of the outward path and having a closed end, a stopping portion disposed in vicinity of the doubled portion along a constricted portion of the heart-shape formed at the center of the other end portion of the heart-shaped island and formed to be deeper than the doubled portion, an escape portion closed and formed in vicinity of the stopping portion and extending toward the other side of the heart-shaped island with a depth deeper than that of the stopping portion, and a returning path extending along the other side of the heart-shaped island with a depth gradually becoming shallower than that of the escape portion to be communicated with the introductory path and having the shallowest end higher than the bottom of the introductory path.

In the conventional storage apparatus, however, there have disadvantages that the lock pin would undesirably become bent or the outer periphery wall of the cam groove would be broken off, due to the hard collision of the lock pin with the outer periphery wall of the cam groove when an abrupt inertia force is applied.

It is therefore an object of this invention to provide a vehicle-mounted storage apparatus equipped with a safety device, which is capable of preventing the lock pin and the cam groove from damaged by forming a tapered surface on the outer periphery wall of the cam groove such that the lock pin is popped up by the tapered surface of the cam groove when the inertia force is applied.

It is therefore another object of this invention to provide a vehicle-mounted storage apparatus equipped with a safety device, which is capable of preventing the unlocking of the popped-up lock pin having been in locked state caused by moving to the escape portion by forming a guide groove having one end opened toward the doubled portion and the other end to be closed such that the popped-up lock pin returns to the returning portion located just before the stopping portion.

DISCLOSURE OF THE INVENTION

In the present invention, a tapered surface inclined toward the bottom of a stopping portion of a cam groove is formed at a projecting portion projecting toward a heart-shape constricted portion of a heart-shaped island in the cam groove of a lock device.

According to this invention, therefore, the distal end of the lock pin, in the locked state of the lock device, is located at a stopping portion of the cam groove. The heart-shaped constricted portion of the heart-shaped island receives the force of the forcing means to stop a projecting object at a non-projecting position.

In the locked state, the projecting object would become further pressed into the housing when an inertia force is applied. As a result, the distal end of the lock pin would be disengaged from the stopping portion of the cam groove to move along the tapered surface of the projecting portion from the bottom of the stopping portion.

At this time, since the tapered surface is inclined toward the bottom of the stopping portion of the cam groove, the distal end of the lock pin would get on the tapered surface so as to be popped-up against the pressing force of the pressing means.

Thereafter, due to the swing-returning effect by the inertia force and the force of the forcing means, the projecting object moves toward the projecting direction from the opening of the housing.

In accordance with this movement of the projecting object, the distal end of the forcing means would fall down again to the bottom of the stopping portion of the cam groove along the tapered surface such that the force of the forcing means could be received by the stopping portion of the cam groove.

Thus, the lock device cam maintain the locked state so as to prevent the projection of the projecting means into the vehicle compartment from the opening of the housing.

Further, in this invention, the projecting portion of the cam groove has a guide groove having one end opened toward the doubled portion and the other end closed.

In this invention, thus, upon application of the inertia force, the distal end of the lock pin would move along the tapered surface to advance into the guide groove from the upper edge portion of the tapered surface.

When the distal end of the lock pin reaches the guide groove, the distal end of the lock pin will be guided by the guide groove and then returns to the doubled portion of the cam groove from the opened end thereof.

Thus, due to the swing-returning effect by the inertia force and the force of the forcing means, when the projecting object moves toward the projecting direction from the opening of the housing, the distal end of the lock pin would advance again to the stopping portion from the doubled portion such that the stopping portion can receive the force of the forcing means.

Since the other end of the guide groove is closed, the distal end of the lock pin having reached the guide groove cannot advance further to the escape portion.

The above and other objects, features and advantages of the present invention will become clear from the following description of the preferred embodiment thereof, taken in conjunction with the accompanying drawings.

BRIEF DESCRIPTION OF THE DRAWINGS

The accompanying drawings show preferred embodiments of the vehicle-mounted storage apparatus equipped with a safety device according to the present invention, wherein

FIG. 1 is a plan view showing essential parts of the cam groove;

FIG. 2 is an exploded perspective view of the storage apparatus according to the present invention;

FIG. 3 is a perspective view showing an assembled state of the storage apparatus;

FIG. 4 is perspective view showing a state where a rid of the apparatus is opened;

FIG. 5 is a cross-sectional view cut along the line V—V in FIG. 3;

FIG. 6 is a cross-sectional view cut along the line VI—VI in FIG. 3;

FIG. 7 is a cross-sectional view cut along the line VII—VII in FIG. 4;

FIG. 8 is a cross-sectional view cut along the line VIII—VIII in FIG. 4;

FIG. 9 is a cross-sectional view showing essential parts of an upper slide holder for explanation;

FIG. 10 is a cross-sectional view showing essential parts of a lower slide holder for explanation;

FIG. 11 is an exploded perspective view of a lock pin and a safety device;

FIG. 12 is a plan view showing the essential parts of the lock pin and the safety device in assembled state;

FIG. 13 is a cross-sectional view cut along the line XIII—XIII in FIG. 12;

FIG. 14 is a plan view of essential parts of the safety device in operating state, corresponding to FIG. 12;

FIG. 15 is a cross-sectional view cut along the line XVI—XVI in FIG. 1;

FIG. 16 is a cross-sectional view cut along the line XVI—XVI in FIG. 1;

FIG. 17 is an exploded perspective view showing a vibration isolator;

FIG. 18 is a cross-sectional view of essential parts of the vibration isolator shown in FIG. 17 in assembled state;

FIG. 19, corresponding to FIG. 6, is a cross-sectional view showing that the state a cassette case is empty;

FIG. 20 is a plan view showing essential parts of the cam groove, FIG. 21 is a cross sectional view showing the cam groove shown in FIG. 20 cut along the line XXI—XXI.

BEST MODE FOR CARRYING OUT THE INVENTION

Figure 1:
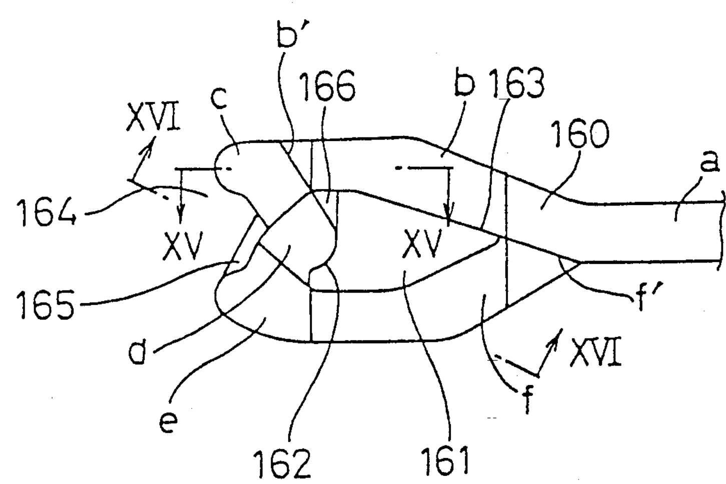
FIGS. 1-19 show a first embodiment to the present invention.

The present invention will be described further in detail with reference to the accompanying drawings.

In FIGS. 2-8, the numeral 10 designates a storage apparatus which is secured as being embedded in e.g.

instrument panel of a vehicle compartment, such that compact cassette cases 20 can be stored in upper and lower stages.

The storage apparatus 10, as shown mainly in FIGS. 2-8, comprises: a hollow box-type housing 30 having an opening 31 in front thereof; a projecting object held in the housing 30 to be movable in the projecting direction from the opening 30, for example a plurality of cassette cases 20 in upper and lower stages partly projecting in the forward direction from the opening 31 of the housing 30; a lower cassette holder 40 forwardly projecting from the opening 31 of the housing 30 with the cassette cases 20 mounted thereon; a rid 50 axially supported on the front edge portion of the lower cassette holder 40 to open/close the opening 31 of the housing 31, and forwardly projecting integrally with the lower cassette holder 40 to incline forwardly down to open; a piston 150 sliding integrally with the lower cassette holder 40 and the rid 50; a forcing means for forcing the cassette case 20 as a projecting object, the lower cassette holder 40, the rid 50 and the piston 150 in the projecting direction from the opening 31 of the housing 30, mainly a forcing spring 60 affecting on the lower cassette holder 40 and the rid 50; a lock device 70 for locking the projecting object, mainly the lower cassette holder 40 at a non-projecting position, in this case a storage position (see FIGS. 5 and 6) in the housing 30 against the force of the spring 60, and for unlocking the lower cassette holder 40 when this holder 40 is pressed into the housing 30 through the rid 50 at the storage position; and a safety device 80 (see FIGS. 12-14) for stopping the unlocking operation of the lock device 70 when an inertia force is applied.

Figure 2:
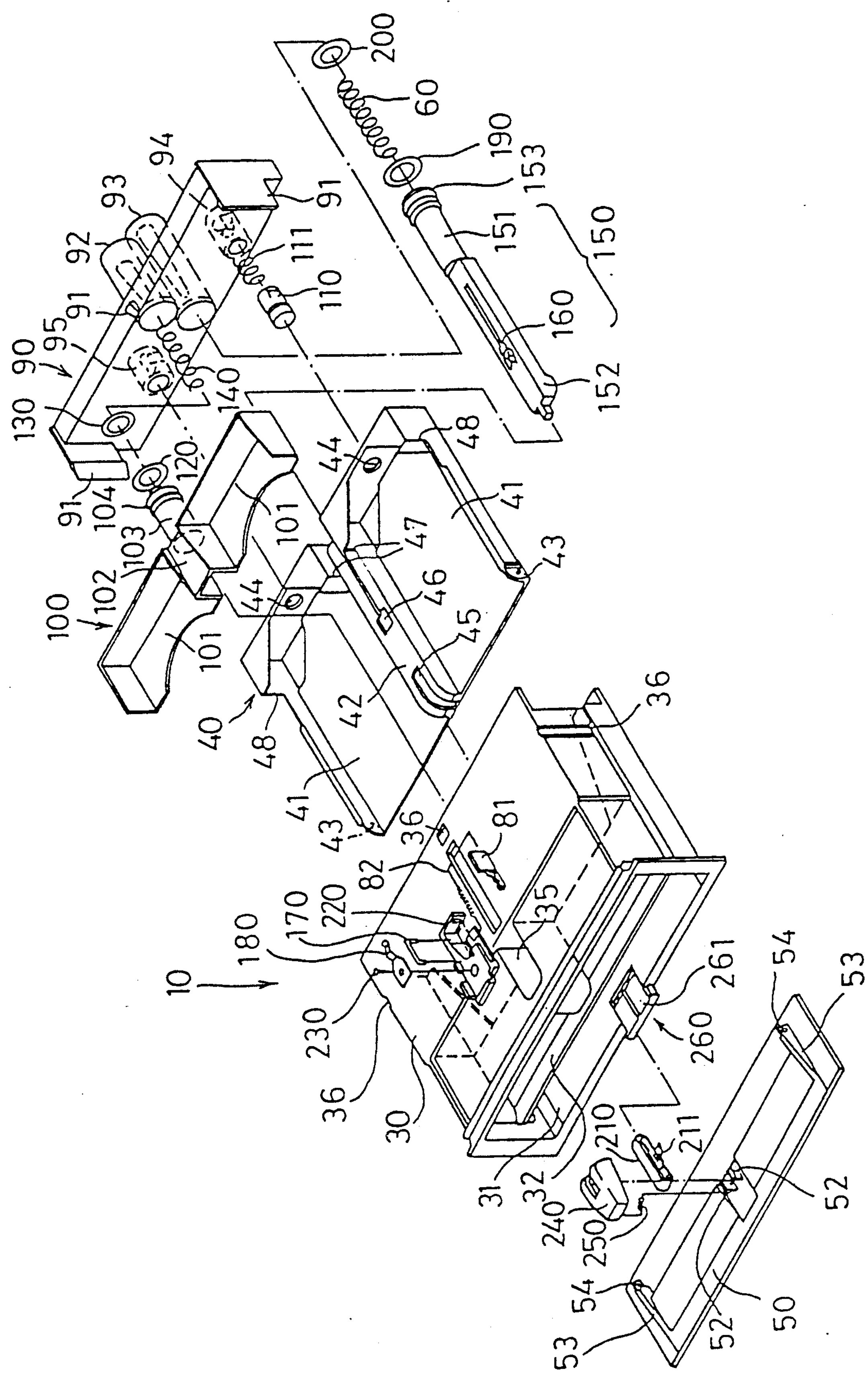
Figure 5:
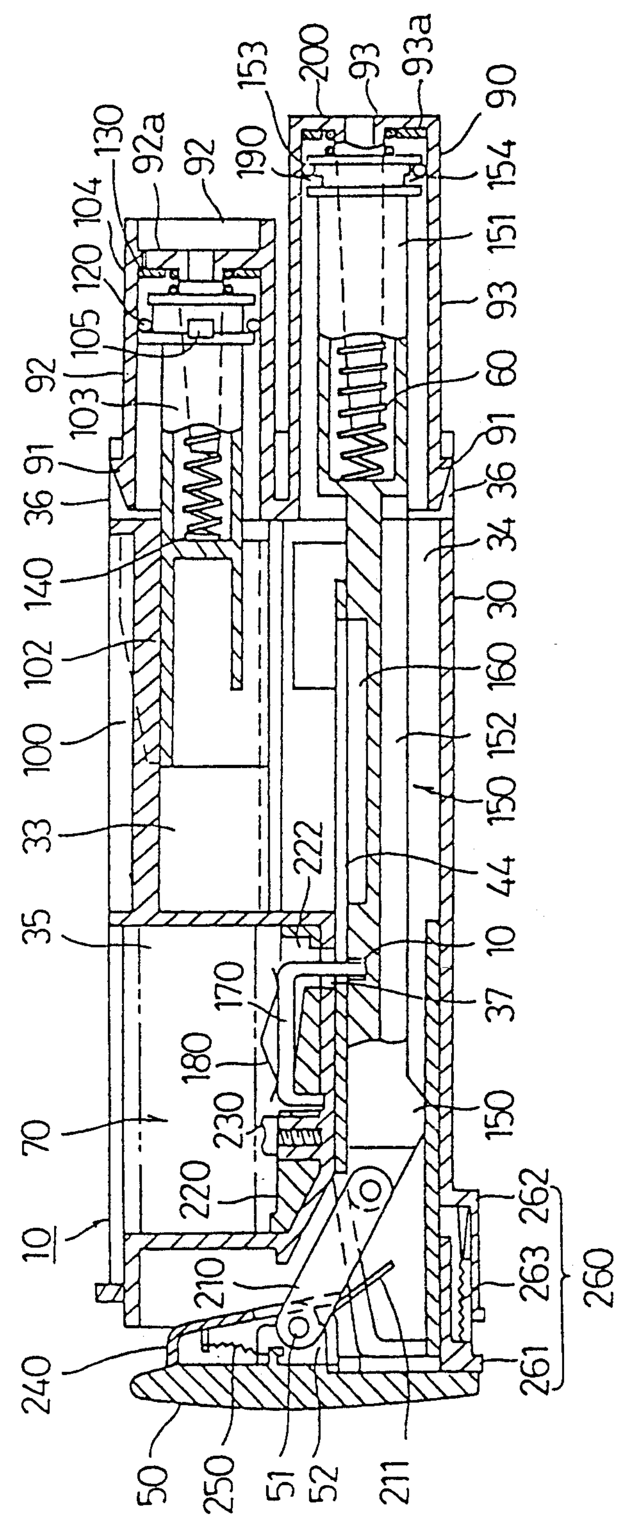

As shown in FIG. 2, the housing 30 has front and rear surfaces both opened in the form of hollow box with vertically flat configuration, and is formed by integral molding of a plastic having a moderate rigidity. The opened rear surface of the housing 30 is closed by the rear cover as shown in FIGS. 2, 5 and 6.

Figure 6:
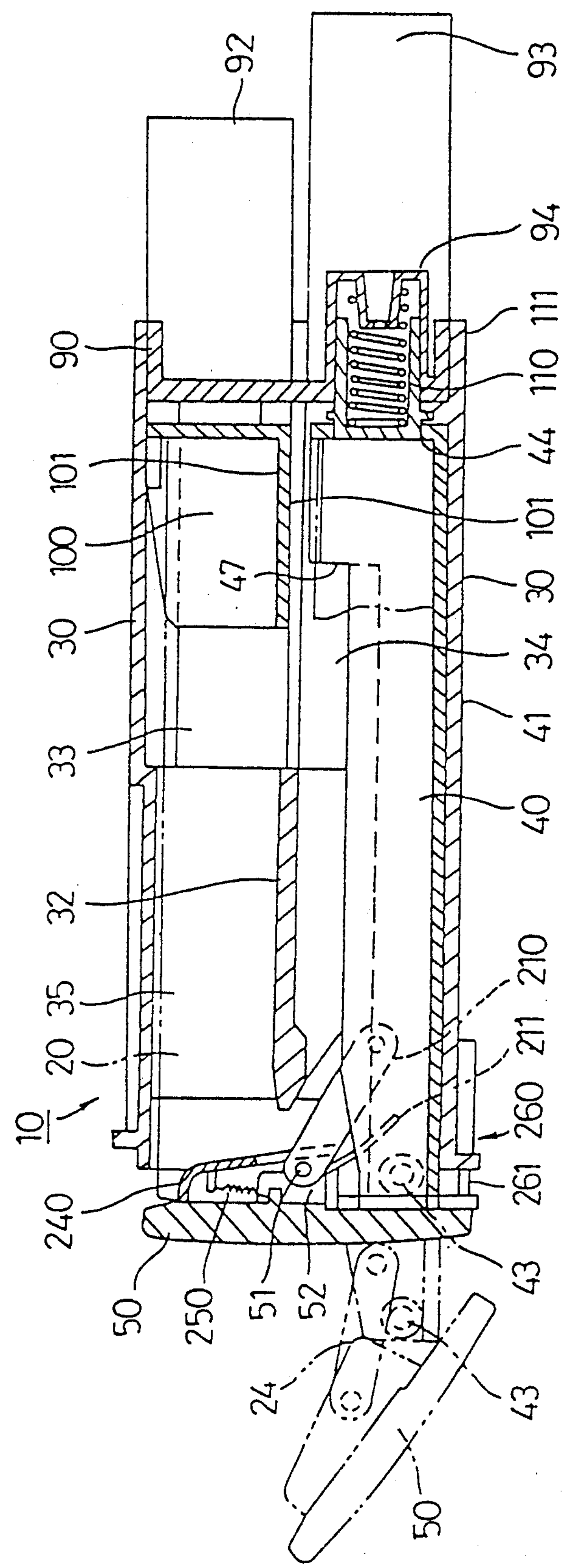

Within the hollow inner side of the housing 30, as shown in FIGS. 2 and 6, there is provided a partition 32 extending in the forward/backward directions almost at the center of its height. This partition 32 divides the hollow inner side substantially into two upper and lower chambers 33, 34.

Figure 8:
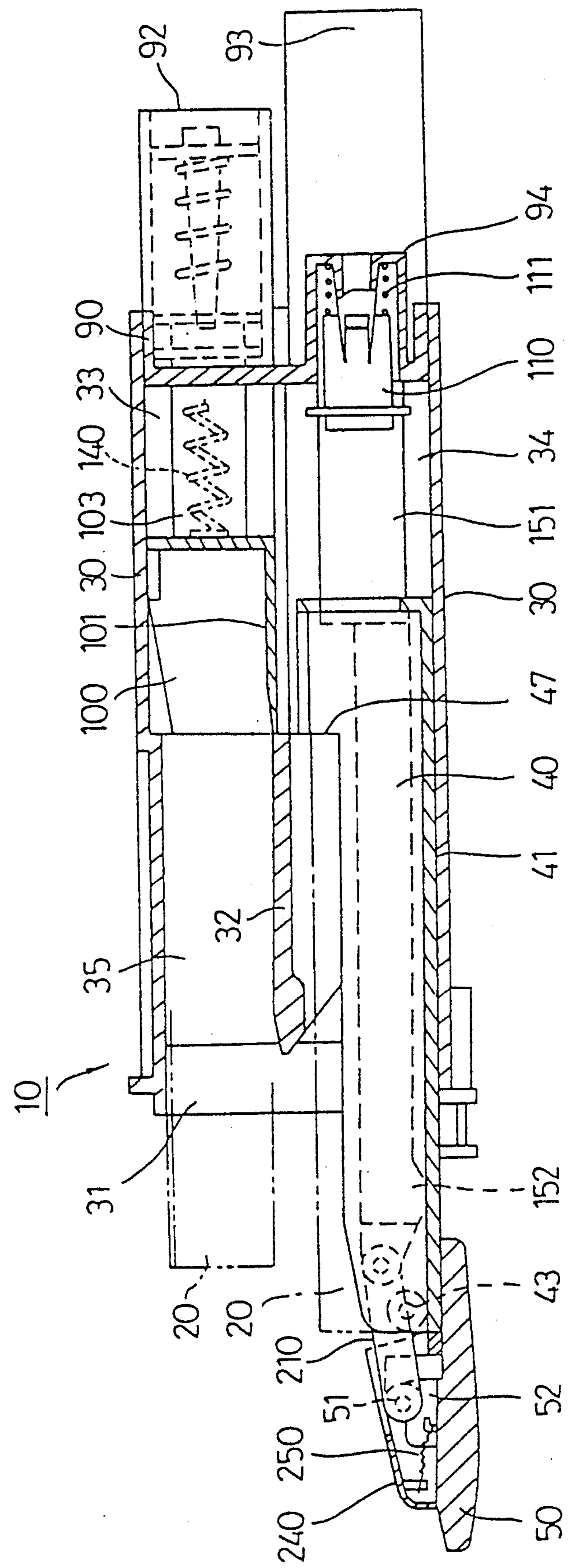

As shown in FIGS. 6 and 8, the upper chamber 33 and the lower chamber 34 of the housing 30 store slidably the upper cassette holder 100 and the lower cassette holder 40 respectively.

On the upper wall of the housing 30, as shown in FIGS. 2-5, a tube-type concave chamber 35, which is partly projecting toward the lower chamber 34 by passing through the partition 32 from the upper chamber 33 of the housing 30 and having an opened upper surface, is formed. This concave chamber 35 divides the opening end portion of the upper chamber into left and right two parts. Therefore, the inside of the upper chamber 33 can store laterally two cassette cases 20 at the left and right sides. As described later, a part of the lock device 70 and the safety device 80 are disposed within the concave chamber 35.

As shown in FIGS. 2-10, the rear cover 90 is removably mounted on the rear edge portion of the housing 30, and integrally molded by using a plastic having a moderate elasticity and rigidity.

Figure 9:
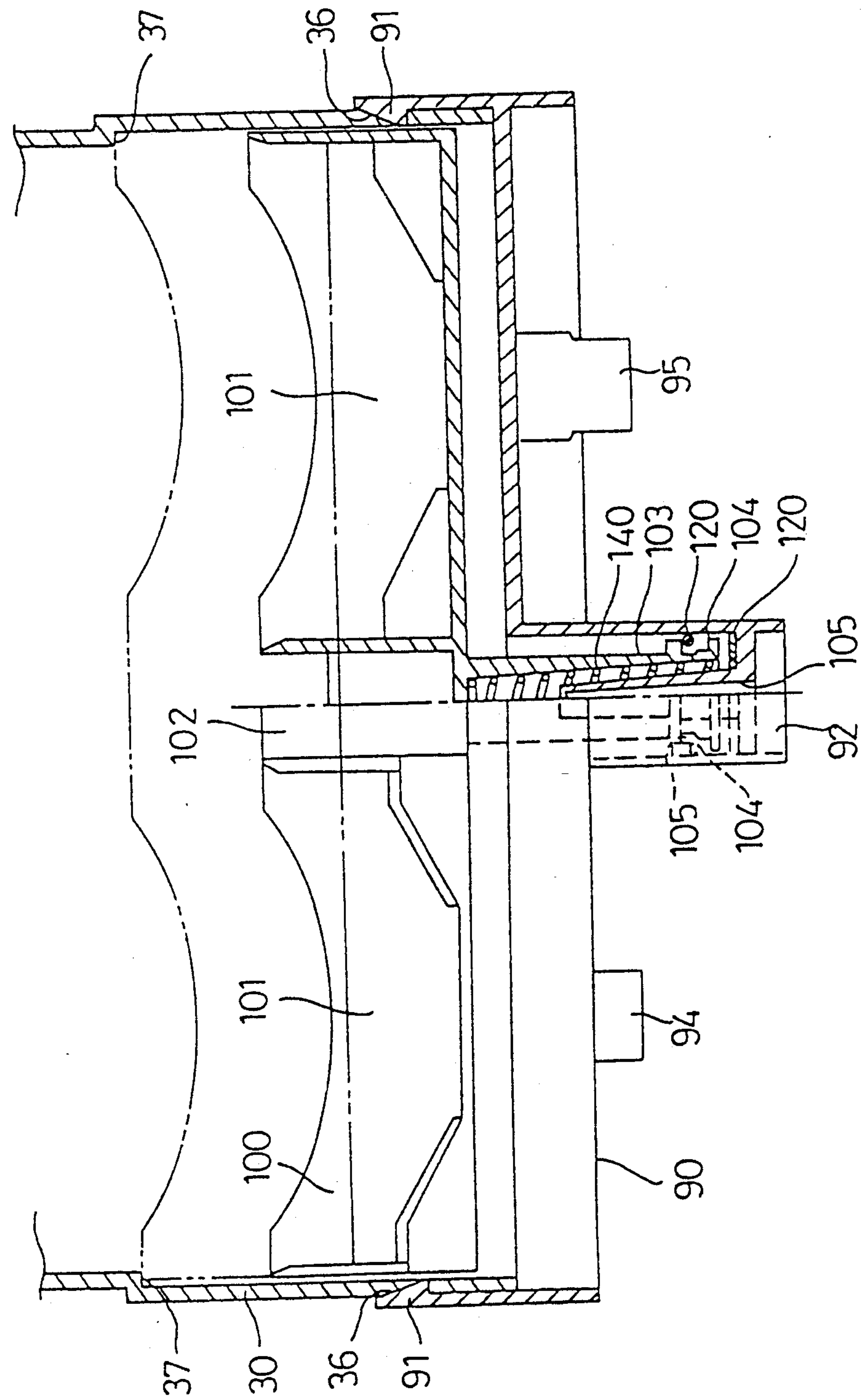
Figure 10:
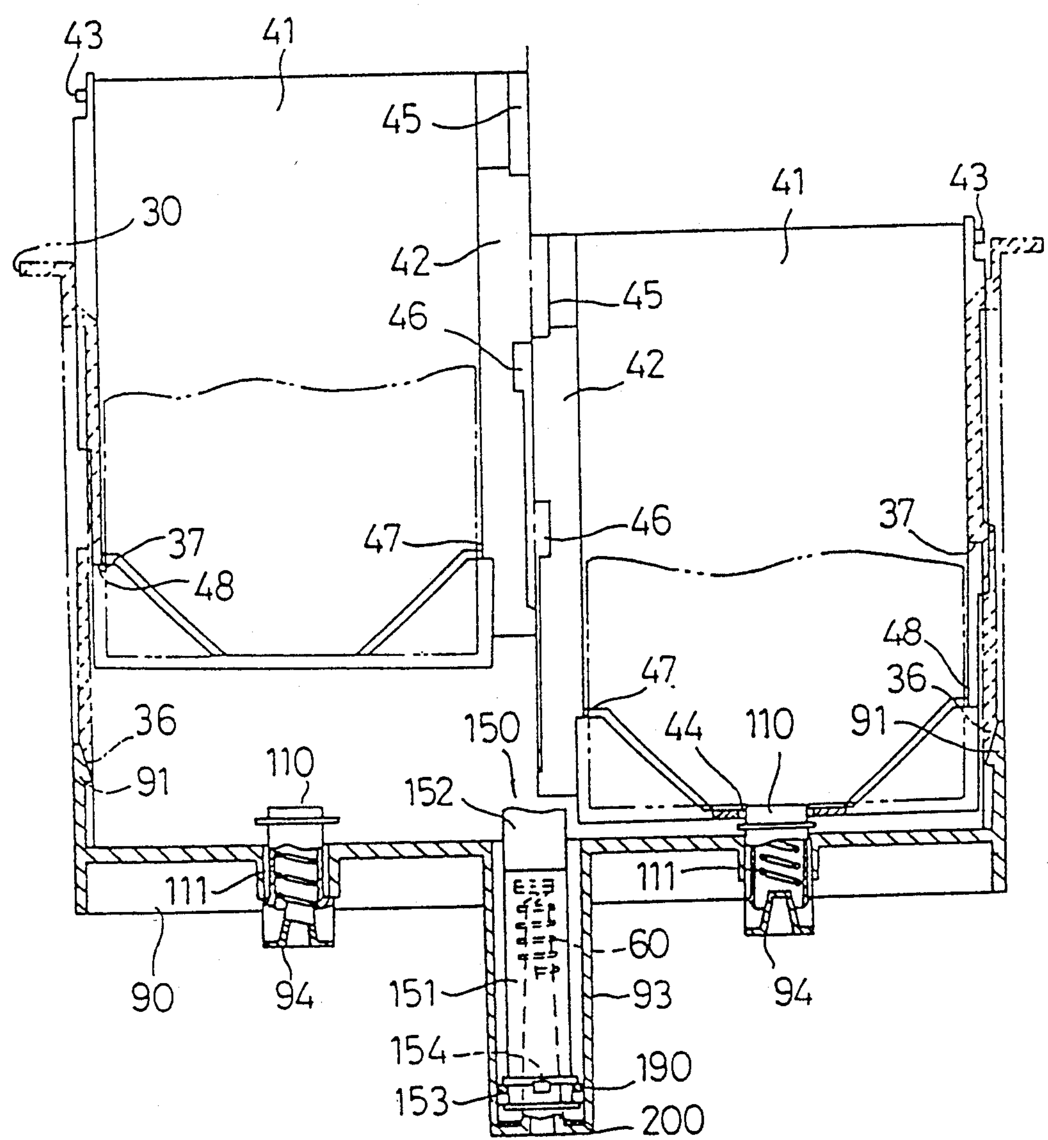

Namely, a plurality of mounting claws 91 . . . are formed at the left and right end portions of the rear cover 90 as shown in FIGS. 2, 9 and 10. On the contrary, a plurality of mounting grooves 36 . . . to be engaged with the mounting claws 91 are formed at the outer surface of both side walls of the housing 30.

Accordingly, when both mounting claws 91 of the rear cover 90 are inserted from the rear side of the housing 30 by being sliding along the outer surface of both side walls, they will securely be engaged with the mounting grooves 36 of the housing 30 as shown in FIGS. 2, 9 and 10. Thus, the rear cover 90 can be mounted on the rear end portion of the housing in one touch, and the opened rear surface is covered by the rear cover 90.

At the widthwise center of the rear cover 90, as shown in FIGS. 2–10, upper and lower cylinders 92, 93, which project backwardly corresponding to the upper and lower chambers 33, 34 respectively, are provided. The entire length of the lower cylinder 93 is set to be larger than that of the upper cylinder 92 located thereabove.

At the left and right sides of the lower cylinder 93, as shown in FIGS. 2, 6, 8–10, a pair of left and right button cylinders 94, 94 projecting backwardly from the rear side surface of the rear cover 90 are provided, respectively. The button cylinders 94, 94 have a shorter inner diameter and shorter entire length in comparison with those of the aforementioned cylinders 92, 93.

As shown in FIGS. 2, 6, 8–10, a pressing button 110 and a pressing spring 111 for forcing the pressing button 110 in the projecting direction from the open end of the button cylinder 94, are provided in the cylinders 94.

The above-mentioned both pressing buttons 110 project into the lower chamber 34 of the housing 30 from the inner side of the respective button cylinders 94, due to the compressed restoring force of the pressing spring 111 as shown in FIGS. 6, 8 and 10. As shown in FIGS. 6 and 10, the pressing buttons 110 project into the lower cassette holder 40 as shown in FIGS. 6 and 10 and as mentioned later, and elastically comes to contact with the rear surface of the cassette case 20 held within the lower cassette holder 40 due to the compressed restoring force of the pressing spring 111 so as to prevent the cassette case 20 from being rickety in the lower cassette holder 40.

The lower cassette holder 40, as shown in FIGS. 2, 4, 8 and 10, comprises: a pair of tray-type left and right cassette mounting portion 41, 41 capable of mounting the cassette cases 20 in lay-down state thereon; and a guide frame 42 disposed substantially at the center of both cassette mounting portions 41 and extending long in the forward/backward directions in the form of tunnel, integrally formed e.g. by using a plastic having a moderate elasticity and rigidity.

Both cassette mounting portions 41 have a pair of left and right projecting shafts 43, 43 projecting laterally in the outward left and right direction at the front edge portion of outer surface of the left and right side walls.

At the rear wall of the cassette mounting portion 41, circular button apertures 44, 44 passing through in the forward/backward directions are formed for receiving the pressing button 110 to pass therethrough.

A slit 45 extending in L-letter form from the front surface toward the upper surface and having an open rear surface is formed at the distal end of the guide frame 42, and on the guide frame there is formed a long aperture 46 extending in the forward/backward directions as shown in FIGS. 2, 5 and 10.

The upper cassette holder 100, as shown in FIGS. 2, 5–9, comprises: a pair of tray-type left and right cassette mounting portions 101 capable of mounting the rear portion of the cassette cases 20 in lay-down state thereon; a tunnel type central frame portion 102 located substantially at the center of both cassette mounting portions 41 and extending long and narrow in the forward/backward directions; and a piston portion 103 extending backwardly from the central frame portion 102 and slidably held in the upper cylinder 92 of the rear cover 90. This upper cassette holder 100 is integrally formed of a material, such as a plastic having a moderate rigidity.

The piston portion 103, as shown in FIGS. 2, 5–9, has a configuration of hollow tube, and a ring groove 104 is formed at the outer periphery thereof. At the bottom of the ring groove 104, an evacuate groove 105 deeper than the residual part is formed at its first half portion.

At the ring groove 104 of the piston portion 103, an O-ring having a diameter less than the groove width is engaged as shown in FIG. 2, 5–9.

Figure 7:
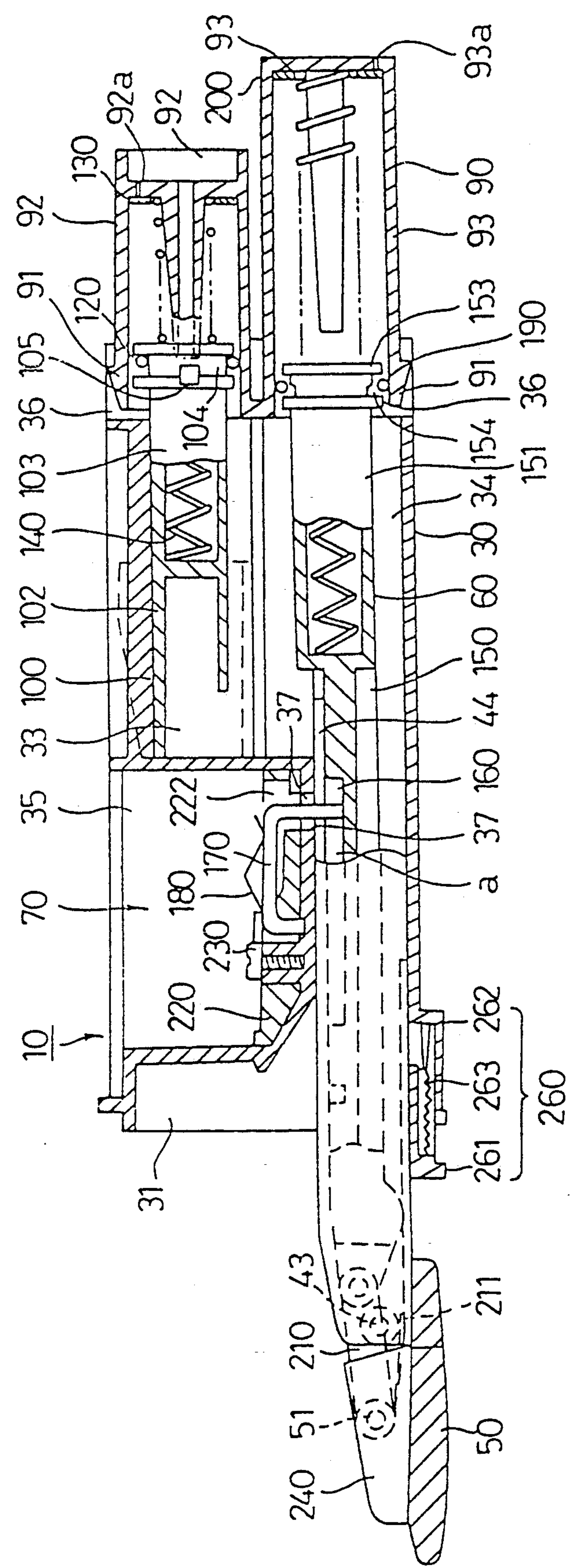

As shown in FIGS. 5, 7, an orifice 92 a is formed at the rear surface of the bottom wall of the upper cylinder 92.

A filter 130 for filtering air absorbed through the orifice *92a* is inserted into the upper cylinder 92 as shown in FIGS. 2, 5–9.

Thereafter, aforementioned pressing spring 140 is inserted into the upper cylinder 92, and this spring 140 is compressed between the bottom of the upper cylinder 92 and the hollow inner side surface of the piston portion 103.

Accordingly, the upper cassette holder 100 will be forced toward the opening 31 of the housing 30 due to the compressed restoring force of the pressing spring 140, as shown in FIGS. 8 and 9.

The most advanced position of the upper cassette holder 100, as shown in FIGS. 8 and 9, is limited by the front end surfaces of the side walls of the left and right cassette holder mounting portions 101 coming into contact with the left and right engaging notches 37, 37 inwardly projecting in mutually opposed state from the inner surface of the left and right side walls of the housing 30, and by the front end surface of the bottom wall coming into contact with the rear surface of the concave chamber 35 projecting into the upper chamber 33 of the housing 30.

The lock device 70 is, as shown mainly in FIG. 2, formed in either one of the housing 30 and the projecting object, in this case the piston 150 which slides together with the lower cassette holder 40 and the rid 50 and forms a pair relative to the lower cylinder 93 of the housing 30, in this case at the piston 150 side. The lock device is composed of a cam groove 160 with the heart-shaped island 161 as its center, a lock pin 170 for tracing the bottom of the cam groove 160 and axially supported on the residual either one of the housing 30 or the piston 150, in this case at the housing 30 side, and a pressing spring 180 as a pressing means for pressing the lock pin 170 toward the bottom of the cam groove 160.

As shown in FIG. 2, the piston 150 is composed of a piston body 151 held slidably in the lower cylinder 93 of the housing 30 and a rod portion 152 inserted into the guide frame 42 of the lower cassette holder 40. This piston 150 is integrally formed e.g. by a plastic.

The piston body 151 has a form of hollow tube as shown in FIGS. 2, 5, 7 and 10 to be capable of receiving the forcing spring 60 thereinto. A ring groove 153 is formed at the outer periphery portion of the piston body 151, and an evacuate groove 154 deeper than the residual part is formed at the first half part of the bottom of the ring groove 153.

As shown in FIGS. 2, 5, 7 and 10, an O-ring 190 of a diameter smaller than the width of the ring groove 153 is engaged with this groove 153 of the piston body 151. The piston body 151 is, with the O-ring 190 being engaged therewith, inserted into the lower cylinder 93 of the housing 30.

On the contrary, as shown in FIGS. 5 and 7, an orifice 93*a* is formed at the rear surface of the lower cylinder 93.

A filter 200 for filtering the air absorbed through the orifice 93*a* is inserted into the lower cylinder 93 as shown in FIGS. 2, 5, 7 and 10.

Thereafter, the forcing spring 60 is inserted into the lower cylinder 93 to be compressed between the closed surface in the hollow inside of the piston body 151 and the bottom surface of the lower cylinder 93.

At the distal end of the rod portion 152, an end portion of a joint 210 is axially supported as shown in FIGS. 2, 4–8. The other end portion of the joint 210 is projected forwardly through a slit 45 of the guide frame 42, and its projected distal end portion has an axially supported rid 50.

Therefore, the rod portion 152 of the piston 150 and the rid 50 are mutually coupled through the joint 210, and the rid 50 is further axially supported on the projecting shaft 43 of the lower cassette holder 40.

Accordingly, the lower cassette holder 40 and the rid 50 are forced toward the projecting direction from the opening 31 of the housing 30 through the piston 150 due to the compressed restoring force of the forcing spring 60, as shown in FIGS. 7 and 8.

Further, steeply-rising and forwardly directed engaging end surfaces 47, 48 are formed at both rear sides of the guide frame 42 of the lower cassette holder 40 and at the rear portion of the side walls of both cassette mounting portions 41, as shown in FIGS. 2, 6, 8 and 10.

In contrast, backwardly directed engaging notches 37 are formed at both inner side surfaces opposed to the left and right sides respectively in the lower chamber 34 of the housing 30, as shown in FIG. 10.

Accordingly, both the engaging end surfaces 48 of the lower cassette holder 40 come to contact with both the engaging notch 37 in the housing 30 as shown at the left-hand in FIG. 10, and both the engaging end surfaces 47 at both sides of the guide frame 42 of the lower cassette holder 40 come to contact with the rear surface of the concave chamber 35 projecting into the lower chamber 34 of the housing 30 as shown in FIG. 8, whereby the most advanced position of the lower cassette holder 40 is limited.

The most advanced position of the lower cassette holder 40 is set, in comparison with the most advanced position of the aforementioned upper cassette holder 100, such that the front surface of its rear wall is at the opening 31 side of the housing 30. The reason why the most advanced position of the lower cassette holder 40 is set at the proximal side is that with such position the cassette cases 20 become vertically projected in staircase form, whereby the cassette cases 20 can be easily taken out.

As shown in FIGS. 1, 2, the cam groove 160 of the piston 150 is formed in the upper surface of the rod portion 152 of the piston 150.

More specifically, as shown in FIG. 1, the cam groove 160 is formed with the heart-shaped island 161 as its center, and the substantially U-letter-constricted portion 162 of the heart-shaped island 161 and the tapering portion 163 positioned at the opposed side of the constricted portion 162 are disposed to direct toward the forward and backward directions respectively of the rod portion 152 of the piston 150.

As shown in FIG. 1, the cam groove 160 comprises: an introductory path a linearly extending to the sharpened tapering portion 163 of the heart-shaped island 161 from the rear side, and having a closed rear end portion; an outward path b extending forwardly along one side of the heart-shaped island 161 with a depth becoming gradually shallower from the introductory path a; a doubled portion c which is closed and having a depth deeper than the shallowest end b' of the outward path; a stopping portion d formed in vicinity of the doubled portion c along the constricted portion 162 of the heart-shaped island 161, and the portion d being deeper than the doubled portion; an escape portion e formed in vicinity of the stopping portion d, extending toward the other side of the heart-shaped island 161, and the portion e being deeper than the stopping portion d and closed; and a returning path f extending along the other side of the heart-shaped island to be communicated with the introductory path a with a depth becoming shallower gradually from the escape portion e, and having the shallowest end f' higher than the bottom of the introductory path a.

Figure 15:
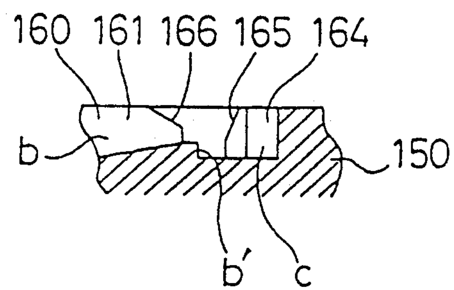
Figure 16:
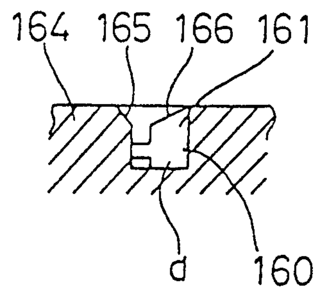

A tapered surface 165 inclined downwardly directing to the bottom of the stopping portion d of the cam groove 160 is formed at the projecting portion 164 projecting toward the constricted portion 162 of the heart-shaped island 161 located at the outer circumference of the cam groove 160, as shown in FIGS. 1, 15 and 16. The lower edge portion of the tapered surface 165 is separated slightly in the upward direction from the bottom of the stopping portion d of the cam groove 160, and extends in the diagonally forward direction to the escape portion e, diagonally traversing the stopping portion d from the doubled portion c. The upper edge portion of the tapered surface 165 is substantially parallel to its lower edge portion.

As described later, the tapered surface 165 acts to protect the lock pin 170 from being damaged when an inertia force is applied, by engaging with the lock pin 170, the distal end 171 of which moves along the inclined tapered surface 165 such that the lock pin 170 is popped-up against the force of the pressing spring 180.

A cut-down portion 166 downwardly inclined toward the bottom of the stopping portion d of the cam groove 160 is formed in vicinity of the constricted portion 162 of the heart-shaped island 161 at the inner periphery edge of the cam groove 160, as shown in FIGS. 1, 15 and 16. The lower edge of the cut-down portion 166 is slightly separated in the upward direction from the bottom of the stopping portion d of the cam groove 160, and is inclined more tenderly in comparison with the tapered surface 165 aforementioned as shown in FIGS. 1, 15 and 16.

The cut-down portion 166 is intended to prevent the interference of the lock pin 170 with the heart-shaped island 161 when the lock pin 170 moves in the cam groove 160.

Figure 11:
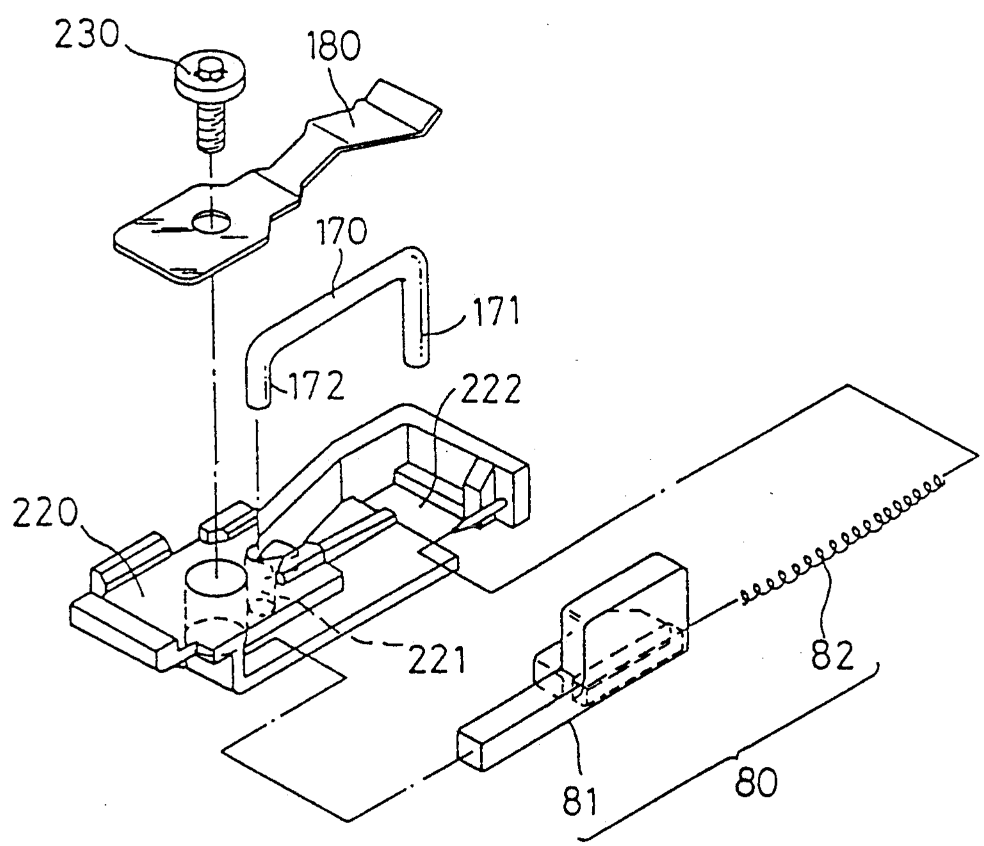

Namely, since the distal end 171 of the lock pin 170 is downwardly bent in the form of L-letter as shown in FIG. 11, this bent portion may easily be interfered, in particular, with the corner portion of the heart-shaped island 161 facing the outward path b, the doubled portion c and the stopping portion d. Therefore, for preventing such interference, the cut-down portion 166 is formed at the corner portion of the heart-shaped island 161.

As shown in FIGS. 11-14, the lock pin 170, the pressing spring 180 and the safety device 80 are assembled to the mounting substrate 220, as shown in FIGS. 11-14. This mounting substrate 220 with the lock pin 170, the pressing spring 180, and the safety device 80 being mounted thereon, is fixed to the bottom of the concave chamber 35 of the housing 30 by using a fixing screw 230.

To start with, the lock pin 170 is formed by bending both ends of a metallic linear material having a circular cross section into substantially U-letter such that one end thereof is shorter than the other end.

Figure 13:
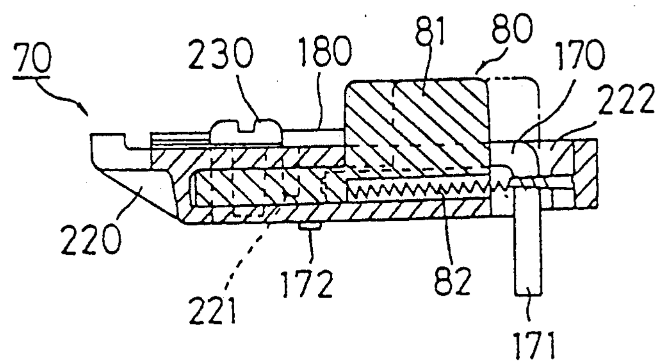

The shorter end portion of the lock pin 170 is, as a shaft portion 172, supported on the shaft aperture 221 formed in the mounting substrate 220, as shown in FIG. 13.

The longer end portion of the lock pin 170, as a distal end portion 171, projects downwardly through a window portion 222 formed in the mounting substrate 220, as shown in FIG. 13. The distal end 171 of the lock pin 170 projecting downwardly through the window portion 222 of the substrate 220 further projects into the lower chamber 34 of the housing 30 through a through hole 37 formed at the bottom of the concave chamber 35 of the housing 30. The distal end 171 of the lock pin 170 projecting into the lower chamber 34 of the housing 30 projects further into the cam groove 160 of the piston 150 through a long hole 46 of the guide frame 42 of the lower cassette holder 40 located within the lower chamber 34 of the housing 30, as shown in FIGS. 5 and 7.

The pressing spring 180 is fixed to the mounting substrate 220 by using a fixing screw 230 for fixing the mounting substrate 220 within the concave chamber 35 of the housing 30. The pressing spring 180 functions to press out the lock pin 170 toward the bottom of the cam groove 160 by its spring force, and to prevent the shaft portion 172 of the lock pin 170 from being falling out upwardly from the shaft aperture 221 of the mounting substrate 220.

The safety device 80 is composed of a response-moving body 81 which projects into the swinging area of the distal end 171 of the lock pin 170 when the inertia force is applied such that the distal end 171 of the lock pin 170 can be prevented from moving to the escape portion e from the stopping portion d of the cam groove 160, and a retracting spring 82 which always forces the response-moving body 81 toward the area out of the swinging area of the distal end 171 of the lock pin 170, as shown in FIG. 11.

Figure 12:
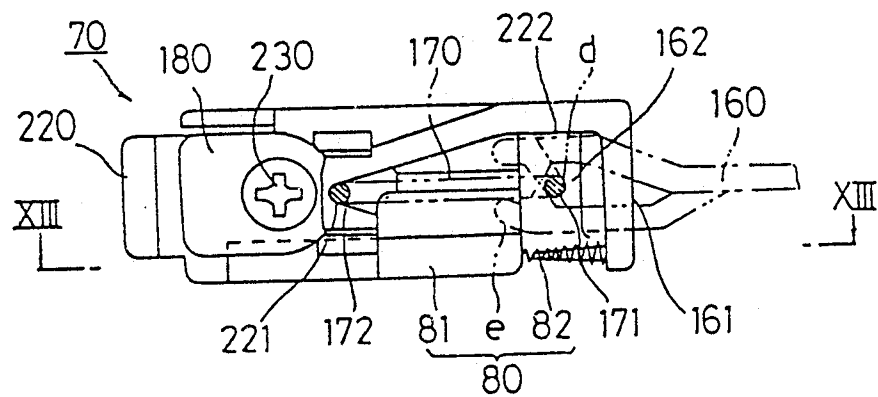
Figure 14:
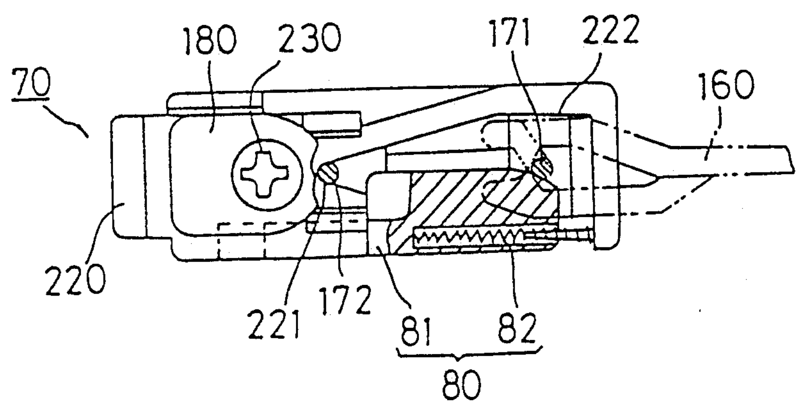

The response-moving body 81 is made of metallic material, and mounted slidably on the mounting substrate 220 as shown in FIGS. 12-14.

The retracting spring 82 is compressed between the mounting substrate 220 and the response-moving body 81 as shown in FIGS. 12 and 13, and its compressed restoring force acts to force the response-moving object 81 toward the area out of the swinging area of the lock pin 170.

The inertia force required to operate the response-moving object 81 can be freely set by varying the spring constant of the retracting spring 82 when the material and form thereof are fixed. In the shown embodiment, the inertia force for operating the response-moving body 81 is set to a value of 3-10 G, for example.

Therefore, only in such a case as an abrupt inertia force exceeding 3 G occurring upon crushing of a motorcar is applied, the response-moving body 81 comes to project into the swinging area of the lock pin 170 against the compressed restoring force of the retracting spring 82 (FIG. 14).

A viscous fluid such as a grease is coated on the sliding contact surface of the response-moving body 81 with the mounting substrate 220 such that the response-moving object 81 having projected into the swinging area of the lock pin 170 does not abruptly return.

In contrast, at a light inertia force of less than 3 G which occurs at the abrupt starting or braking of vehicle, the response-moving body 81 maintains out of the swinging area of the lock pin 170, due to the compressed restoring force of the retracting spring 82 (FIG. 12, 13).

Next, as to the structure of the rid 50, this rid 50 has a form of a plate and integrally formed of e.g. a plastic having a moderate elasticity and rigidity.

A pair of coupling pieces 52, 52, protruding opposedly from the inner side surface directing upwardly and having a shaft portion 51 for axially supporting the joint 210 in the opposed space, is formed substantially at the center of the rid 50.

A pair of left and right guide ribs 53, 53, acting as guides when the cassette case 20 is inserted into the lower cassette holder 40 and protruding substantially in the form of triangle directing from the inner side surface upwardly directing, are formed at the left and right end portions of the rid 50. Shaft apertures 54, 54 to be engaged with the pair of left and right projecting shafts 43 projecting outwardly from the lower cassette holder 40 are formed at the rear end portion of the guide ribs.

And, in the space between both the coupling pieces 52 of the rid 50, the other end of the joint 210 is inserted by making use of the elasticity of the coupling pieces 52 such that the joint 210 is axially supported on the shaft portion 51 of the coupling pieces 52.

Accordingly, the rid 50 and the piston 150 are mutually coupled through the joint 210.

The projecting shafts 43 of the lower cassette holder 40 are inserted into the shaft aperture 54 of the rid 50 by making use of the elasticity of the left and right side walls of the lower cassette holder 40 or the guide rib 52 of the rid 50.

Figure 4:
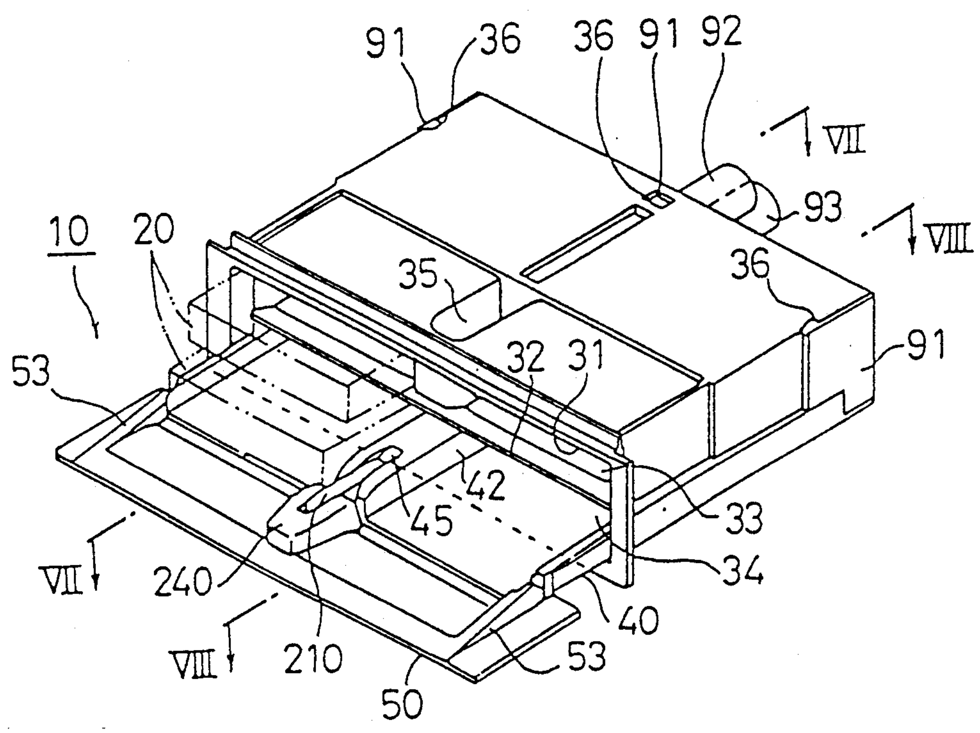

As a result, the rid 50 will rotate with the projecting shaft 43 of the lower cassette holder 40 as its center, and inclines forwardly in front of the opening 31 of the housing 30 to open as shown in FIGS. 4, 7 and 8. The maximum open angle of the rid 50 is limited by the contact of the upwardly directed rear end portion of the inner side surface with the lower surface of the bottom wall of the lower cassette holder 40, as shown in FIGS. 7, 8. At this time, the upwardly directed inner surface of the rid 50 is set to substantially flush with the upper surface of the bottom wall of the lower cassette holder 40.

The joint 210 has a plate spring portion 211 extending diagonally and backwardly from its lower surface as shown in FIGS. 2, 5 and 7, and is integrally formed of e.g. a plastic having a moderate elasticity and rigidity. This plate spring portion 211 acts to prevent the abrupt opening of the rid 50 by contacting elastically with the upwardly directed inner surface of the rid 50 when the rid is opened.

Further, the upper side of the joint 210 is covered with a hollow cup-type case 240 as shown in FIGS. 2, 4–8. A tensile spring 250 is engaged between the hollow inner surface of the case 240 and the rid 50 as shown in FIGS. 2, 5 and 6, and the restoring force of this tensile spring 250 acts to maintain the state of the case 240 against the rid 50. The case 240, cooperating with the guide rib 52 of the rib 50, functions as a guide when the cassette case 20 is inserted into the lower cassette case holder 40.

Figure 17:
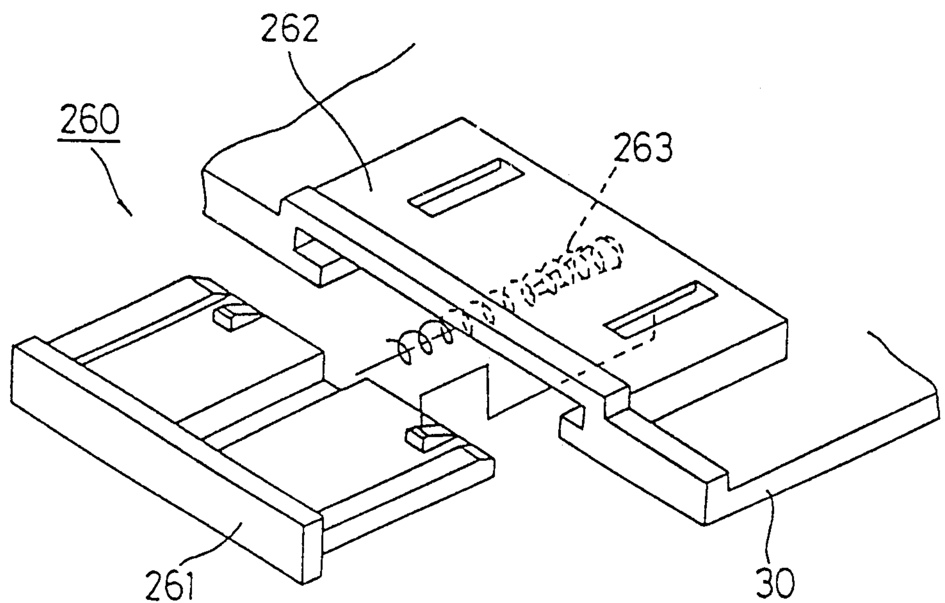
Figure 18:
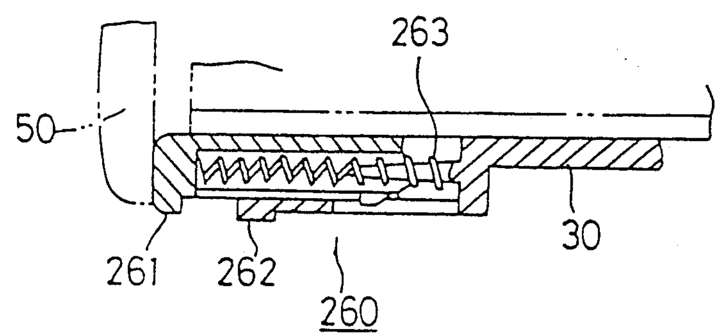
Figure 19:
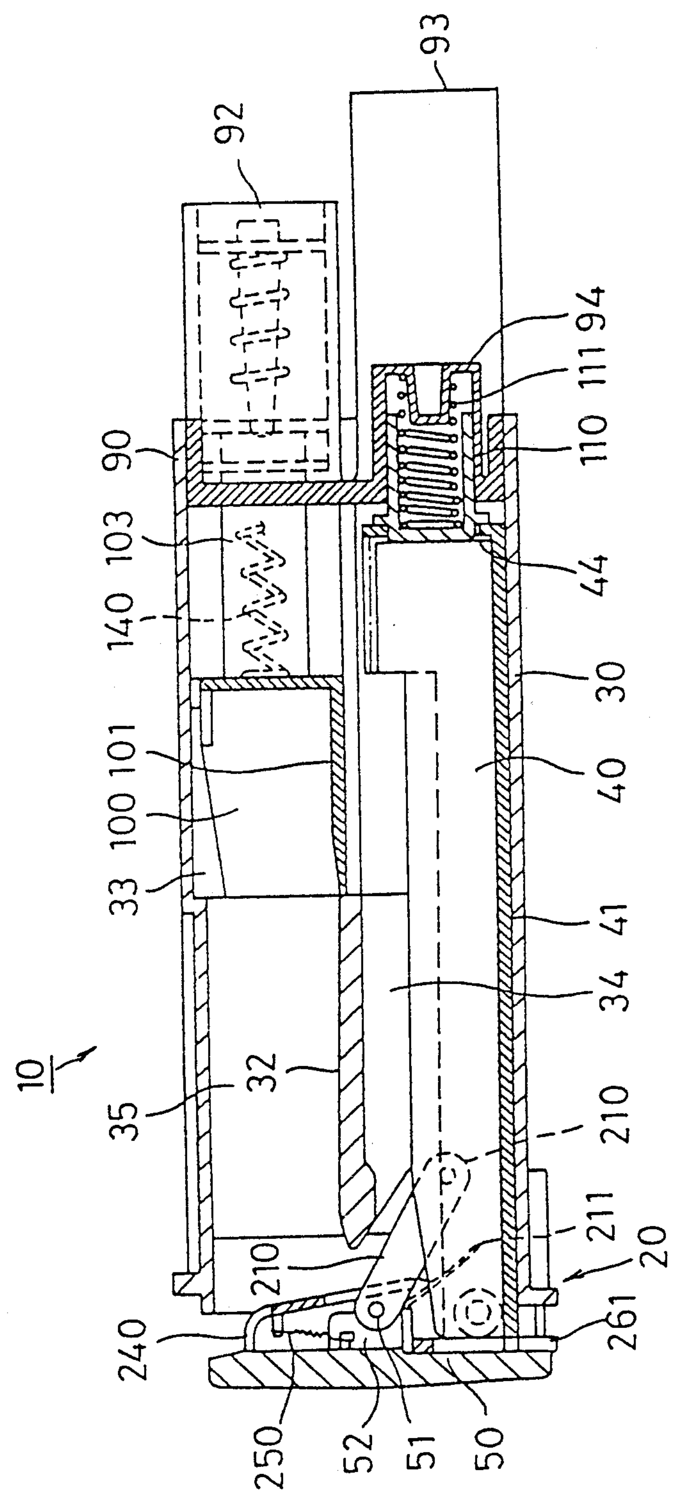

On the other hand, the numeral 260 in FIGS. 2, 17 and 18 designates a vibration isolator of the rid 50. The vibration isolator 260 comprises: a pressure body 261 to be in contact with the inner surface of the closed rid 50; a guide frame 262 for holding slidably the pressure body 261; and a vibration-isolating spring 263 for forcing the pressure body 261 toward the direction projecting from the guide frame 262.

Therefore, the pressure body 261, as shown in FIG. 18, comes to be in elastic contact with the inner surface of the closed rid 50 such that the inner surface of the rid 50 is prevented from directly crushing with the front edge portion of the opening 31 of the housing 30.

Meanwhile, the assembled storage apparatus 10 is, though not shown, embeddedly fixed together with the cassette deck and other audio apparatus to the instrument panel etc. in the vehicle compartment.

Next, the operation of the storage apparatus 10 will be described. The rid 50 in closed state can be easily opened by pressing out its front surface toward the housing 30.

Namely, when the rid 50 is pressed out, the lower cassette holder 40 will retract together with the rid 50.

Further, the piston 150 will retract together with the lower cassette holder 40 since the piston 150 is coupled to the rid 50 through the joint 210.

When the piston 150 is retracted, the position of the cam groove 160 at the upper surface of the piston body 151 will be varied. Therefore, the distal end 171 of the lock pin 170 having been at the stopping portion d of the cam groove 160 advances to the escape portion e deeper than the stopping portion d in accordance with the displacement of the cam groove 160. At this time, since the doubled portion c is shallower than the stopping portion d, the distal end 171 of the lock pin 170 cannot advance to the doubled portion c from the stopping portion d.

Since the distal end 171 of the lock pin 170 having reached the escape portion e would collide with its closed end portion, not capable of pressing the rid 50 anymore.

As a result, on releasing the force for pressing the rid 50, the piston 150 advances due to the compressed restoring force of the forcing spring 60.

In accordance with the advance of the piston 150, the position of the cam groove 160 at the upper surface of the piston body 151 will be varied. In consequence, the distal end 171 of the lock pin 170 having been at the stopping portion d of the cam groove 160 will reversely advance the escape portion e to reach the returning path f. At this time, since the stopping portion d is shallower than the escape portion e, the distal end 171 of the lock pin 170 having reached the escape portion e cannot return to the stopping portion d from the escape portion e.

The distal end 171 of the lock pin 170 having reached the returning path f will further advance, due to the further moving of the piston 150, to the introductory path a deeper than the returning path f.

In accordance with the advancement of the piston 150, the rid 50, the lower cassette holder 40, and the cassette case 20 disposed in the lower cassette holder 40 integrally advance through the joint 210, as shown in FIGS. 4, 8.

When the piston body 151 of the piston 150 advances within the lower cylinder 93 of the rear cover 90, air is absorbed through the orifice 93*a*, as shown in FIG. 7.

As a result, the rid 50, the lower cassette holder 40, and the cassette case 20 disposed in the lower cassette holder 40, through the joint 210, will project from the opening 31 of the housing 30 quietly and slowly.

Further, on opening of the rid 50, the plate spring portion 211 of the joint 210 elastically contacts with the upwardly directed upper surface of the rid 50 for preventing abrupt and rough opening of the rid 50, as shown in FIG. 7.

When the rid 50 advances and opens, the upper cassette holder 100 also advances toward the opening 31 of the housing 30 due to the compressed restoring force of the pressing spring 140, as shown in FIG. 7 and 8.

Namely, when the cassette case 20 is disposed in the upper cassette holder 100 and the rid 50 is closed, the front surface of the cassette case 20 is pressed by the inner surface of the rid 50 as shown in FIGS. 5, 6. Therefore, the upper cassette holder 100 is at the retracted position by being pressed through the cassette case 20.

On the contrary, when the rid 50 advances and opens, the front surface of the cassette case 20 is opened such that the upper cassette holder 100 will advance due to the compressed restoring force of the pressing spring 140 as shown in FIGS. 7, 8.

At this time, the piston portion 103 of the upper cassette holder 100 advances in the upper cylinder 92 of the rear cover 90 as shown in FIG. 7, whereby air is absorbed through the orifice 92*a*.

As a result, the cassette case 20 held on the upper cassette holder 100 will project quietly and slowly from the opening 31 of the housing 30.

As mentioned earlier, at this time, since the most advanced position of the lower cassette holder 40 is set at more proximal side than that of the upper cassette holder 100, the cassette case 20 having been held in the holders 40, 100 will project vertically in staircase form from the opening of the housing 30, as shown in FIGS. 4, 8.

Next, for storing the cassette case 20 in the housing 30, firstly the rid 50 is upwardly closed, and then the lower cassette holder 40 and the cassette case 20 together with the rid 50 are pressed into the housing 30.

Upon pressing the closed rid 50 into the housing 30, the piston 150 will be retracted through the joint 210.

When the piston 150 retracts, the position of the cam groove 160 at the upper surface of the piston body 151 will change. Therefore, the distal end 171 of the lock pin 170 having been in the introductory path a of the cam groove 160 will reversely advance along the introductory path a in accordance with the displacement of the cam groove 160, by passing from the introductory path a to the outward path b. Since the shallowest end f' of the returning path f is shallower than the introductory path a, the distal end 171 of the lock pin 170 having reached the introductory path a cannot return to the returning path f from the introductory path a.

When the piston 150 further retracts, the distal end 171 of the lock pin 170 having reached the outward path b will advance to the doubled portion c deeper than the doubled portion c. The distal end 171 of the lock pin 170 having reached the doubled portion c will collide with the closed end portion of the doubled portion c, so as not to be able to press the rid any more.

Therefore, when the force for pressing the rid 50 is released, the piston 150 advances due to the compressed restoring force of the forcing spring 60.

In accordance with the advancement of the piston 150, the distal end 171 of the lock pin 170 will reversely advance the doubled portion c until the stopping portion d deeper that the doubled portion c. Since the shallowest end b' of the outward path b is shallower than the doubled portion c, the distal end 171 of the lock pin 170 having reversely advanced the double portion c cannot return to the outward path b from the doubled portion c.

On reaching the stopping portion d, the distal end 171 of the lock pin 170 will interfere with the constricted portion 162 of the heart-shaped island 161 as shown in FIGS. 12, 13, such that the lock device 70 will be locked again by receiving the compressed restoring force of the forcing spring 60 by the constricted portion 162 of the heart-shaped island 161.

Figure 3:
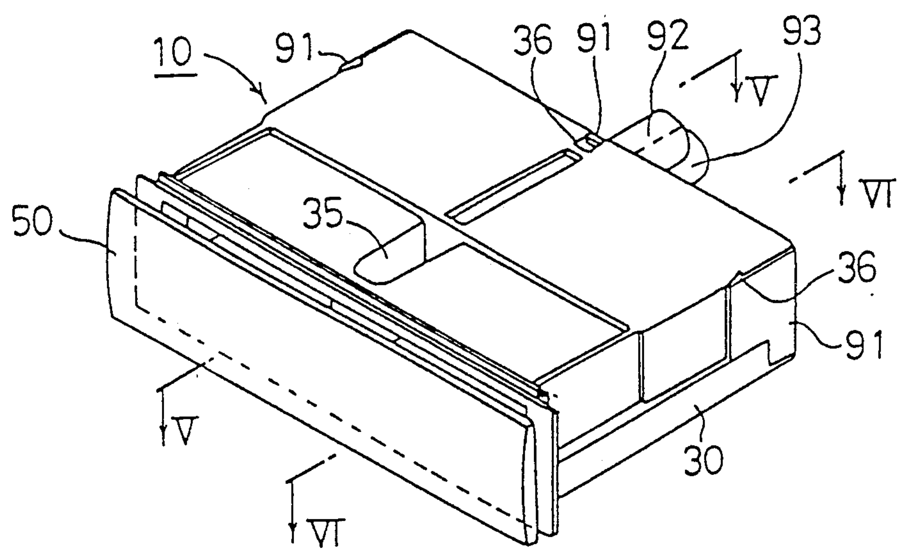

At this locked position, the opening 31 of the housing 30 will be covered with the rid 50 as shown in FIGS. 3, 5 and 6.

In accordance with the retraction of the piston 150, the piston body 151 will retract within the lower cylinder 93 of the rear cover 90 as shown in FIG. 5.

At this time, the O-ring 190 having been engaged with the ring groove 153 of the piston body 151 will move to the first part of the ring groove 153 due to the friction resistivity with the inner periphery surface of the lower cylinder 93, as shown in FIG. 5. When the O-ring 190 moves to the first half portion of the ring groove 153, the air in the lower cylinder 93 will instantaneously be evacuated from the evacuate groove formed at the first half portion of the ring groove 153.

As a result, since there is no braking force when the lower cassette holder 40 is pressed through the rid 50, the rid 50 can be pressed with a relatively small force.

When the lower cassette case holder 40 is pressed, the pressure buttons 110 will be inserted into the button holes 44 of the rear wall as shown in FIG. 6. Both the pressure buttons 110 projecting into the lower cassette holder 40 will elastically contact with the rear surface of the cassette case 20 held by the lower cassette holder 40 due to the compressed restoring force of the pressure spring 111.

Accordingly, since the front surface of the cassette case 20 is elastically pressed to the inner surface of the closed rid 50, it is possible to prevent the cassette case 20 from being rickety in the lower cassette holder 40 due to the inertia force generated by travelling vibration, abrupt acceleration or decceleration of the vehicle.

On the other hand, when the rid 50 is pressed in closed state, the front surface of the cassette case 20 held in the upper cassette holder 100 will retract by being pressed by innersurface of the rid 50 as shown in FIGS. 5, 6.

In accordance with the retraction of the upper cassette holder 100, its piston portion 103 will retract within the upper cylinder 92 of the rear cover 90 against the compressed restoring force of the pressing spring 140.

At this time, the O-ring 120 engaged with the ring groove 104 of the piston 103 will move to the first half portion of the ring groove 104 due to the friction resistivity with the inner periphery surface of the upper cylinder 92. When the O-ring 120 moves to the first half portion in the ring groove 104, the air in the upper cylinder 92 will instantaneously be evacuated through a evacuate groove 105 formed in the first half portion.

Therefore, no braking force will arise when the upper cassette holder 100 is pressed through the cassette case 20 such that the rid 50 can be pressed with a relatively small force.

Further, since the upper cassette holder 100 is forced toward the opening 31 of the housing 30 due to the compressed restoring force of the pressing spring 140, the rear surface of the cassette case 20 will become pressed toward the front surface of the rear wall of the upper cassette holder 100 to elastically contact with the inner surface of the closed rid 50.

Accordingly, since the front surface of the cassette case 20 is elastically pressed to the inner surface of the close rid 50, it is possible to prevent the cassette case 20 from being rickety in the upper chamber 33 of the housing 30 due to the inertia force generated by the travelling vibration, abrupt acceleration or decceleration.

In the closed state of the rid 50, the pressure body 261 will elastically contact with the inner surface of the rid 50 due to the compressed restoring force of the vibration-isolating spring 263.

Thus, it is possible to prevent the inner surface of the rid 50 from directly crushing with the front edge portion of the opening 31 of the housing 30 to become rickety, caused by the retraction of the rid 50 together with the lower cassette holder 40 by the inertia force generated by the travelling vibration, abrupt acceleration or deceleration.

On the other hand, in the state where no cassette case 20 is inserted into the holders 40, 100, the upper cassette holder 100 maintains its most advanced position and the pressure buttons 110 is projects into the lower cassette holder 40 to the maximum.

Next, in the locked state of the lock device 70, when an abrupt inertia force such as one exceeding 3G occurs at the vehicle crush, the safety device 80 acts to stop the unlocking operation of the lock device 70.

Namely, such an abrupt inertia force acts to make the rid 50 and the lower cassette holder 40 be retracted, whereby the rid 50 becomes pressed toward the housing 30.

Therefore, the piston 150 retracts integrally with the rid 50 so as to make displacement of the cam groove 160 formed at the upper surface of the piston 150.

Then, the distal end 171 of the lock pin 170 having been in the stopping portion d of the cam groove 160 will tend to advance to the escape portion e from the stopping portion d in accordance with the displacement of the cam groove 160.

At this time, since the response-moving body 81 retracts against the compressed restoring force of the retracted spring 82 as shown in FIG. 14 so as to project into the swinging area of the lock pin 170.

The distal end 171 of the lock pin 170 therefore contacts with the response-moving body 81 projecting into the swinging area to stop the swinging operation so as not to advance to the escape portion e from the stopping portion d anymore.

Thus, the locked state of the lock device 70 can be maintained by preventing the rid 50 and the lower cassette holder 40 from being projected and the rid 50 from being opened. In consequence, on crushing of the vehicle, the rid 50 and the lower cassette holder 40 do not project into the vehicle compartment allowing to prevent the crew-member from receiving hard blow on his head by the projected portion such as the rid 50, thereby enhancing the safety.

Next, the function of the tapered surface 165 of the cam groove 160 will be described.

When such abrupt inertia force as mentioned above is applied, the piston 150 retracts and the position of the cam groove 160 formed on the upper surface thereof will be displaced.

As a result, the distal end 171 of the lock pin 170 at the stopping portion d will move from its state in contact with the constricted portion 162 of the heart-shaped island 161 to the projecting edge portion 164 located at the opposed side thereof, in accordance with the displacement of the cam groove 160.

At this time, the distal end 171 of the lock pir 170 will engage with the tapered surface 165 formed at the projecting edge portion 164 to move along the inclined surface thereof, such that the distal end 171 of the lock pin 170 will be poped-up from the bottom of the stopping portion d against the spring force of the pressing spring 180.

As a result, the lock pin 170 can be prevented from damaged.

Namely, if the side wall surface of the projecting edge portion 164 is a vertical wall, the distal end 171 of the lock pin 170 will be undesirably bent upon strongly crushing against the vertical wall. Once the distal end 171 of the lock pin 170 is thus bent, it cannot smoothly trace the cam groove 160.

There have been, therefore, disadvantages that the lock device 70 cannot be unlocked even after the inertial force is stopped, the cassette case 20 cannot be taken out, the rid 50 cannot be closed once after opened, or the rid 50 and the lower cassette holder 40 cannot smoothly slide or open/close.

In this invention, the lock pin 170 is prevented from damaged by poping-up the distal end 171 of the lock pin 170 from the bottom of the stopping portion d against the spring force of the pressing spring 180 by virtue of the tapered surface 165 of the projecting edge portion 164.

Thereafter, when the swing back of the inertia force and the inertia force stop, the piston 150 is slightly pressed back by the compressed restoring force of the forcing spring 60. As a result, the distal end 171 of the lock pin 170, pressed downwardly by the force of the pressing spring 180, moves along the tapered surface 165 of the projecting edge portion 164 toward the bottom of the stopping portion d. The distal end 171 of the lock pin 170 then will be interfered again with the constricted portion 162 of the heart-shaped island 161 as shown in FIGS. 12, 13, and this constricted portion 162 receives the compressed restoring force of the forcing spring 60, thereby maintaining the locked state of the lock device 70.

Figure 20:
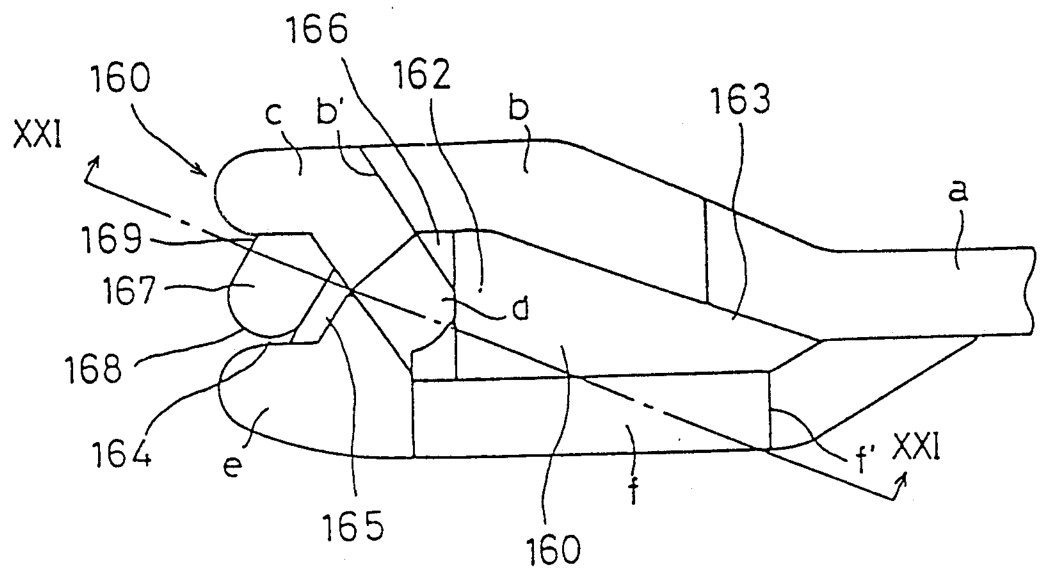
FIGS. 20 and 21 show another embodiment of the present invention where
Figure 21:
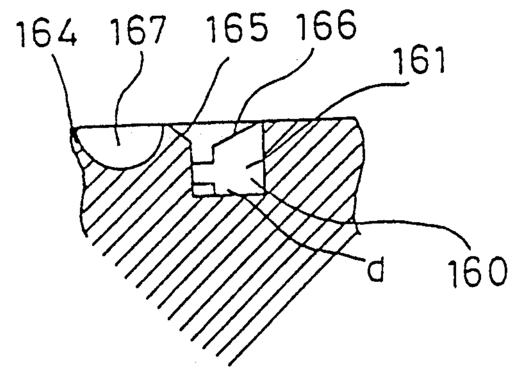

FIGS. 20, 21 show another embodiment of the present invention, and FIG. 20 is a plan view showing the essential part of the cam groove while FIG. 21 is a cross-sectional view cut along the line XXI—XXI in FIG. 20.

This embodiment features the improved cam groove 160 of the piston 150. In particular, it is characterized in that a guide groove 167 is formed along the upper edge portion of the tapered surface 165 of the projecting edge portion 164, having one end opened toward the doubled portion C and the other end closed.

Namely, the guide groove 167 is inclined forwardly along the upper edge portion of the tapered surface 165 and is concave in the form of U-letter cross-section, as shown in FIGS. 20, 21. The distal end 168 of the guide groove 167 is closed while the other inclined rear end 169 is opened diagonally backwardly toward the doubled portion C as shown in FIG. 20.

According to this embodiment, when an abrupt inertia force generated at the crushing of a vehicle etc. is applied, the distal end 171 of the lock pin 170 will pass over the upper edge portion of the tapered surface 165 after moving along the inclination of the tapered surface 165, and then falls down into the guide groove 167.

After stopping the swing-back of the inertia force and the inertia force, the piston 150 will be slightly pressed back by the compressed restoring force of the forcing spring 60. As a result, the piston 150 moves along the guide groove 167 with being pressed downwardly by the spring force of the pressing force 180, and thereafter falls down into the bottom of the doubled portion c.

Further, the advancement of the piston 150 will lead the distal end 171 of the lock pin 170 to move toward the stopping portion d from the doubled portion c so as to interfere with the constricted portion 162 of the heart-shaped island 161. This constricted portion 162 of the heart-shaped island 161 receives the compressed restoring force of the forcing spring 60 so as to lock again the lock device 70.

Since the guide groove 167 is forwardly inlined and has the inclined distal end 168 which is closed, when the piston 150 retracts due to the inertia force, the distal end 171 of the lock pin 171 moves toward the closed distal end 168 of the guide groove 167 and stops at this end 168 so as not to be disengaged from the guide groove 167.

According to this embodiment, it is possible to securely lead the distal end 171 of the lock pin 170 to the stopping portion d of the cam groove 160 even when the distal end 171 of the lock pin 170 has passed over the tapered surface 165, to provide a reliable lock device 70.

For the explanation of this embodiment, the same or similar components as or to the previous embodiment will be referred by the same numerals and symbols, and detailed description for such components are omitted.

In the shown previous embodiments, the cassette case 20, the lower cassette holder 40 and the rid 50 have been mentioned as projecting objects, but it is also possible that only any one of the cassette case 20, lower cassette holder 40, and the rid 50 is used as a projecting object. For example, if the cassette case 20 is directly stored in the housing 30, the cassette holder and the rid can be omitted.

Further, as a storage apparatus 10, it is possible to use those other than the cassette case 20, e.g. ashtray, glove compartment such as glove box or coin case, and cup holder. In this case, the rid, inner case, tray, cup holder etc. will be the projecting object.

In addition, as a forcing means, any members other than the forcing spring shown in the embodiments, such as a constant-pressure spring or a tensile spring can be used.

On the other hand, though in the shown embodiments the cam groove 160 of the lock device 70 has been formed in the piston 150 of the projecting object and the lock pin 170 has axially been supported at the housing 30 side, it is also possible, in vice versa, to form the cam groove 160 at the housing 30 side and to axially support the lock pin 170 at the projecting object side.

INDUSTRIAL APPLICABILITY

As mentioned above, the storage apparatus of this invention is disposed in the vehicle compartment to be used for the storage case of compact cassettes, ashtray, glove box, coin case, cup holders etc., and is suitable to such parts that would project into the vehicle compartment when an abrupt inertia force generated by e.g. crushing of the vehicle is applied.

I claim:

1. A vehicle-mounted storage apparatus equipped with a first safety device which comprises a housing having an opening, a projecting object held in the housing and movable in a projecting direction through the opening on the housing, forcing means for forcing the projecting object in the projecting direction through the opening of the housing, a lock device for locking the projecting object at a non-projecting position relative to the forcing means, said lock device being unlocked when the projecting object in the non-projecting position is pressed into the housing, and a second safety device for stopping an unlocking operation of the lock device when an inertia force is applied, wherein said lock device is composed of: a cam groove formed in one of the housing and the projecting object and having a heart-shaped island in a center thereof; a lock pin axially supported on the other of the housing and the projecting object for tracing a bottom of the cam groove; and pressing means for pressing the lock pin toward the bottom of the cam groove, said cam groove is composed of: an introductory path extending toward a sharpened tapering portion of the heart-shaped island; an outward path extending along one side of the heart-shaped island with a depth becoming gradually shallower from the introductory path; a double portion which is closed and deeper than a shallowest end of the outward path; a stopping portion formed in a vicinity of the doubled portion and deeper than the doubled portion, said stopping portion extending along the heart-shaped constricted portion at a middle of one end portion of the heart-shaped island; an escape portion formed in a vicinity of the stopping portion, said escape portion being deeper than the stopping portion, extending toward the other side of the heart-shaped island, and being closed; and a returning path extending along the other side of the heart-shaped island with a depth gradually becomming shallower from the escape portion to be communicated with the introductory path, and having a shallowest end higher than the bottom of the introductory path, said cam groove of the lock device has a tapered surface inclined toward a bottom of the stopping portion of the cam groove at a projecting edge portion projecting toward the heart-shaped constricted portion of the heart-shaped island.

2. An apparatus according to claim 1, wherein said housing has an upper wall, opened front and rear surfaces in a form of a vertically flat hollow box, the opened rear surface of the housing is closed by a rear cover, a partition extending in the projecting direction substantially at a middle of a height and dividing a hollow inside of the housing substantially into upper and lower chambers is disposed in the housing, the upper chamber is formed to slidably store an upper cassette holder therein and the lower chamber is formed to slidably store a lower cassette holder, a tube-type concave chamber having an opened upper surface is formed at a widthwise center of a front edge portion of the upper wall and is passing through the partition from the upper chamber and partly projecting into the lower chamber so as to divide substantially into a left and a right part, an inside of the upper chamber having a left and a right side is formed such that cassette cases can be stored laterally in each of the left and right sides thereof.

3. An apparatus according to claim 2, wherein an upper and a lower cylinders projecting backwardly in correspondence to the upper chamber and the lower chamber respectively are disposed at a widthwise center of the rear cover forming the housing.

4. An apparatus according to claim 3, wherein a entire length of the lower cylinder is larger than that of the upper cylinder located thereabove.

5. An apparatus according to claim 2, wherein the rear cover forming the housing has a pair of left and right button cylinders which are formed at right and left sides of the lower cylinder with an inner diameter being smaller than and an entire length being shorter than those of both cylinders, and extending backwardly from a rear surface of the rear cover.

6. An apparatus according to claim 5, wherein a pressure button and a pressure spring for forcing the pressure button toward a projecting direction from an opened end of the button cylinder is disposed in the button cylinder, both pressure buttons are designed to project into the lower cassette holder disposed in the lower chamber of the housing from the button cylinders adapted to elastically contact with rear surfaces of the cassette cases that may be held in the lower cassette holder.

7. An apparatus according to claim 2, wherein the upper cassette holder comprises: a pair of tray-type left and right cassette mounting portions capable of mounting rear portions of cassette cases in a laterally laydown state; a tunnel type central frame portion disposed substantially at a center of the cassette mounting portions and extending long and narrowly in the projecting direction; and a piston portion extending backwardly from the housing and being held in an upper cylinder attached to the rear cover.

8. An apparatus according to claim 7, wherein said piston portion is formed in a hollow-tube configuration and has a ring groove formed at an outer periphery thereof, an evacuate groove deeper than the other part of the ring groove, and an O-ring having a diameter smaller than the width of the ring groove to be engaged with the ring groove.

9. An apparatus according to claim 3, wherein the upper cylinder has a rear surface which has a bottom wall and wherein an orifice having an inner side and an outer side is formed at a rear surface of a bottom wall of the upper cylinder, and a filter for filtering air absorbed through the orifice is inserted into a inner side of the orifice.

10. An apparatus according to claim 3, wherein a pressing spring is inserted into the upper cylinder, said pressing spring being compressed between a bottom portion of the upper cylinder and a hollow inner side surface of the piston portion, said upper cassette holder is forced toward the opening of the housing by a compressed restoring force of the pressing spring.

11. An apparatus according to claim 1, wherein said projecting object comprises: a plurality of cassette cases partly projecting in a forward direction through the opening of the housing; a lower cassette holder for mounting the cassette cases thereon; a rid axially supported on a front edge portion of the lower cassette holder for opening/closing the opening of the housing, and projecting forwardly integrally with the lower cassette holder to fall down forwardly so as to be opened; and a piston for sliding together with the lower cassette holder and the rid.

12. An apparatus according to claim 11, wherein the piston comprises: a piston body slidably held in a lower cylinder of the housing; and a rod portion extending from the piston body and inserted into a guide frame of the lower cassette holder.

13. An apparatus according to claim 12, wherein the piston body is inserted into the lower cylinder of the housing formed in a hollow tube style as a whole, a forcing spring as a part of the forcing means being disposed in the piston body, said piston body having a ring groove formed at a periphery edge portion of a rear edge portion of the piston body and an evacuate groove formed adjacent to the ring groove and deeper than the ring groove, an O-ring having a diameter smaller than the width of the ring groove being engaged with the ring groove, and a joint having one end axially supported on the rid being axially supported on a distal end of the rod portion.

14. An apparatus according to claim 3, wherein an orifice is formed at a bottom surface of the lower cylinder, a filter for filtering air absorbed through the orifice is inserted into an inner side of the orifice, and a forcing spring as a part of the forcing means is inserted into the lower cylinder, wherein the piston body has a hollow inside region and the spring being compressed between a closed portion at said hollow inside region of the piston body and the bottom surface portion of the lower cylinder.

15. An apparatus according to claim 1, wherein said safety device comprises: a response-moving body for projecting into a swinging area of a distal end of the lock pin when an inertia force is applied to prevent the distal end of the lock pin from being moved to a escape portion from the stopping portion of the cam groove; and a retracting spring for forcing always the response-moving body toward a area out of the swinging area of the distal end of the lock pin.

16. An apparatus according to claim 15, wherein said response-moving body is mounted slidably on a mounting substrate, while the retracting spring is compressed between the mounting substrate and the response-moving body for forcing the response-moving body toward the area out of the swinging area of the lock pin due to a compressed restoring force of the spring.

17. An apparatus according to claim 1, wherein a lower edge portion of the tapered surface is slightly separated from the bottom of the stopping portion of the cam groove, diagonally traverses the stopping portion from the doubled portion, and extends forwardly diagonally toward the escape portion, and an upper edge portion of the tapered surface is formed to be substantially in parallel to the lower edge portion thereof.

18. An apparatus according to claim 1, wherein a cut-out portion inclined downwardly toward the bottom of the stopping portion of the cam groove is formed in a vicinity of the constricted portion of the heart-shaped island at an inner circumference of the cam groove, a lower end portion of the cut-out portion is formed to be slightly separated from the bottom of the stopping portion of the cam groove, and is formed diagonally more moderately than the tapered surface.

19. An apparatus according to claim 1, wherein the lock pin, a pressing spring and a safety device are fixed to the housing.

20. An apparatus according to claim 1, wherein the lock pin is formed in a form of substantially U-letter, and composed of a metallic elongated material having a configuration of circular cross-section, said lock pin having one shorter end axially supported in a shaft hole formed in a mounting substrate and the other longer end as a distal end passing through a through hole formed at a bottom of a concave chamber of the housing to project into a lower chamber of the housing, and the distal end of the lock pin projecting into the lower chamber of the housing passing through a long aperture of a guide frame of a lower cassette holder located in the lower chamber of the housing and being disposed in the cam groove.

21. An apparatus according to claim 1, wherein a guide groove having one end opened toward the doubled portion and a closed other end is formed along an upper edge portion of the tapered surface at the projecting edge portion of the cam groove.

* * * * *